(12) United States Patent
Rohrer

(10) Patent No.: US 11,698,242 B2
(45) Date of Patent: Jul. 11, 2023

(54) PHOSPHORESCENT FIBER OPTIC SIGHT SYSTEM

(71) Applicant: Jens Rohrer, Billings, MT (US)

(72) Inventor: Jens Rohrer, Billings, MT (US)

( * ) Notice: Subject to any disclaimer, the term of this patent is extended or adjusted under 35 U.S.C. 154(b) by 0 days.

(21) Appl. No.: 17/502,024

(22) Filed: Oct. 14, 2021

(65) Prior Publication Data

US 2022/0113116 A1 Apr. 14, 2022

Related U.S. Application Data

(60) Provisional application No. 63/091,304, filed on Oct. 14, 2020.

(51) Int. Cl.
*F41G 1/10* (2006.01)
*F41G 1/34* (2006.01)
*G02B 27/20* (2006.01)
*F21V 8/00* (2006.01)
*F41G 1/01* (2006.01)

(52) U.S. Cl.
CPC ............... *F41G 1/345* (2013.01); *F41G 1/01* (2013.01); *F41G 1/10* (2013.01); *G02B 6/0003* (2013.01); *G02B 27/20* (2013.01)

(58) Field of Classification Search
CPC ...................................................... F41G 1/345
See application file for complete search history.

(56) References Cited

U.S. PATENT DOCUMENTS

| | | | | |
|---|---|---|---|---|
| 5,359,800 | A | * | 11/1994 | Fisher .................... F41G 1/345 42/144 |
| 6,216,352 | B1 | * | 4/2001 | Lorocco .................... F41G 1/32 42/145 |
| 9,335,165 | B2 | * | 5/2016 | Profos ....................... G01C 3/00 |
| 2011/0138639 | A1 | * | 6/2011 | Kingsley ............. G02B 6/0003 33/275 R |
| 2022/0026176 | A1 | * | 1/2022 | Salamon, III ........... F41G 1/345 |

* cited by examiner

*Primary Examiner* — J. Woodrow Eldred

(57) ABSTRACT

A phosphorescent sight system is provided comprising a rear sight for disposition along a proximal portion of a slide substrate of a firearm and a front sight for disposition along a distal portion of the slide substrate. The sight system may further comprise an optical waveguide disposed within a waveguide cavity of the rear sight or the front sight. Further, a phosphorescent element may be disposed adjacent a proximal portion of the optical waveguide.

18 Claims, 7 Drawing Sheets

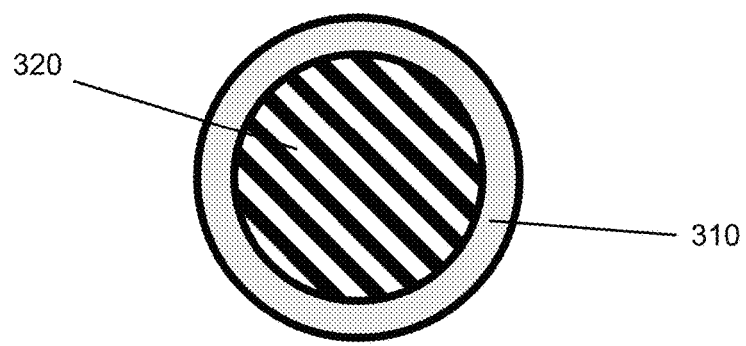
Figure 3     300
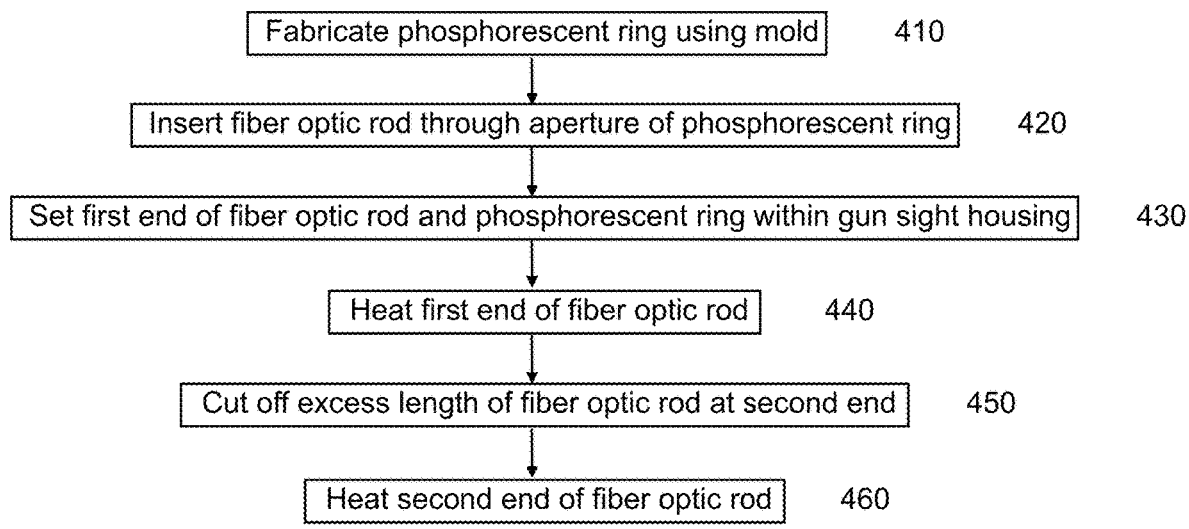
Figure 4     400

PHOSPHORESCENT FIBER OPTIC SIGHT SYSTEM

CROSS-REFERENCE TO RELATED APPLICATIONS

This application claims priority to U.S. Provisional Patent Application Ser. No. 63/091,304, entitled "Phosphorescent Fiber Optic Sight System," filed Oct. 14, 2020. The contents of this application are hereby incorporated by reference in their entirety.

BACKGROUND OF THE INVENTION

From its creation, firearms have been woven into the fabric of American society and continue to be utilized for recreation, protection and military purposes. As of 2020, roughly 42 percent of all US households reported owning at least one firearm. The US firearm industry produces roughly 10 million firearms annually and accounts for roughly $60 billion in domestic sales each year. The number of background checks performed for those seeking to purchase a firearm doubled from 20 million in 2012 to 40 million in 2020.

One of the primary reasons individuals desire to purchase firearms is the protection of life and personal property from criminals. From the years 2003-2007, an average of 3.7 million home invasions occurred each year with the homeowner being present in roughly 1 million of those instances and became victims of violence roughly 25% of the time. Roughly 12% of all home invasions involved the perpetrator wielding a firearm.

Presently, a home invasion occurs once every 30 seconds in the United States and the average loss from such an occurrence is roughly $3,000 without factoring the mental and emotional harm stemming therefrom. Further, home invasion statistically is the most feared crime with 58% reporting that they specifically fear a break-in while they are sleeping. Additionally, rural areas are statistically much more likely to experience a break-in than densely-populated areas.

One of the issues firearm users face in low visibility environments is the ability to accurately shoot the firearm. Gun sights may help the firearm user in accurately shooting the firearm. The global gun sight market is expected to grow beyond $1 billion by the end of the decade with the increasing prevalence of luminescent sights in the military contributing towards this growth in the gun sight market. The military segment held the largest market share for application in small arms and heavier handheld weapons. Additionally, other outdoor activities like paintball are increasing the demand for luminescent gun sights. However, the relatively high cost of gun sight devices prices some retail consumers out of this industry.

Additionally, luminescent optics such as phosphorescent, fluorescent and other like luminous fiber optics may further assist the user in shooting accurately in low visibility environments. For instance, luminescent optics aligned with gun sights provide the firearm user with the ability to optically paint a target. Further, the luminescent illumination may be useful to the firearm user when aiming their firearm in dark settings such as poorly lit buildings, caves, dense forests, dusk or night-time environments and the like. However, common issues with luminescent optics include the optic losing its excited luminescent state, the optic not producing a high enough illumination intensity, the optic requiring incident excitation energy too frequently and the like.

Therefore, it would be advantageous to provide a product that allows a firearm user to more accurately aim their firearm. Further, it would be advantageous to provide a luminescent gun sight that allows a firearm user to paint a target during day or night settings. Moreover, it would be advantageous to provide a firearm user with a luminescent optic that maintains its excited luminescent state for a longer duration to increase the number of use cases for the optic. Additionally, it would be advantageous to provide a luminescent optic that requires a relatively small amount of incident excitation energy intensity to place the optic into an excited illumination state while also producing an illumination beam with a relatively high intensity.

BRIEF DESCRIPTION OF THE DRAWINGS

FIG. 3 illustrates a cross-sectional view of a phosphorescent ring disposed around a fiber optic of a phosphorescent sight system in accordance with some embodiments of the present invention.

FIG. 4 illustrates a flow diagram of a method of manufacture of a phosphorescent sight system in accordance with some embodiments of the present invention.

DETAILED DESCRIPTION OF THE INVENTION

Figure 1:
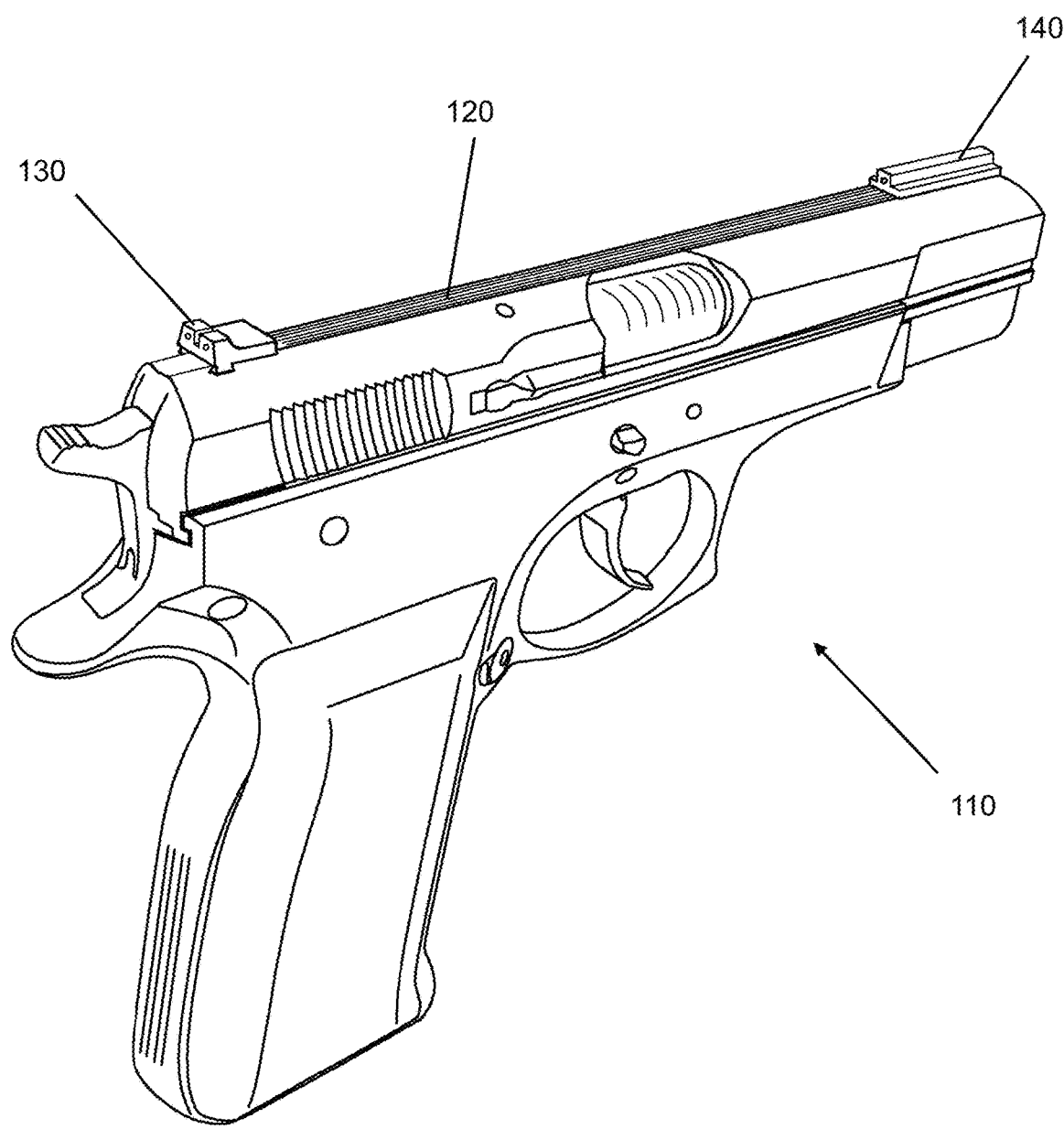
FIG. 1 illustrates a perspective view of a phosphorescent sight system in accordance with some embodiments of the present invention.

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting.

In some embodiments, a phosphorescent sight system is provided, comprising a rear sight for disposition along a proximal portion of a slide substrate of a firearm; a front sight for disposition along a distal portion of the slide substrate; an optical waveguide disposed within a waveguide cavity of the rear sight or the front sight; and a phosphorescent element disposed adjacent the optical waveguide.

In some embodiments, the phosphorescent element is a phosphorescent ring disposed within a ring well that structurally corresponds to dimensions of the phosphorescent ring.

In some embodiments, the phosphorescent element is excited into an active mode by excitation energy incident thereupon.

In some embodiments, upon being excited into the active mode, the phosphorescent element begins to decay towards an inactive mode.

In some embodiments, the active mode and the inactive mode are separated by a threshold intensity of a visible illumination produced by the optical waveguide and the phosphorescent element.

In some embodiments, the threshold intensity of the visible illumination corresponds to the capability of a human eye to physically detect the intensity of the visible illumination.

In some embodiments, the rear sight comprises a first waveguide aperture and a second waveguide aperture disposed symmetrically about either side of a common optical axis; and the front sight comprises a central waveguide aperture disposed along the common optical axis.

In some embodiments, the rear sight and the front sight collectively comprise a plurality of optical waveguides and a plurality of phosphorescent elements.

In some embodiments, each of the plurality of phosphorescent elements of each of the rear sight and the front sight are disposed around the associated optical waveguide at a proximal end of the optical waveguide closest to a firearm user.

In some embodiments, a source of the excitation energy is contained within the rear sight or the front sight.

In some embodiments, the optical waveguide and the phosphorescent element together produce visible illumination.

In some embodiments, the visible illumination is a coherent illumination beam.

In some embodiments, the optical waveguide is a fiber optic.

In some embodiments, the optical waveguide is an optical resonator.

In some embodiments, the optical waveguide is contained within a laser-producing system that is itself contained within the front sight.

In some embodiments, an excitation energy source is controlled by a timing circuit and a printed circuit board to administer a predetermined amount of excitation energy to the phosphorescent element.

In some embodiments, the predetermined amount of excitation energy maintains the phosphorescent element in an active state.

In some embodiments, the predetermined amount of excitation energy comprises pulsing the phosphorescent element with excitation energy for time duration within a range between 1 second per 1 minute and 2 seconds per 1 minute.

In some embodiments, a phosphorescent sight system is provided, comprising a rear sight for disposition along a proximal portion of a slide substrate of a firearm; a front sight for disposition along a distal portion of the slide substrate; an optical waveguide disposed within a waveguide cavity of the rear sight or the front sight; and a phosphorescent element disposed adjacent a proximal portion of the optical waveguide, wherein: the phosphorescent element operates between an active mode and an inactive mode based upon the application of excitation energy to the phosphorescent element; and the active mode and the inactive mode are separated by a threshold intensity of visible illumination produced by the optical waveguide and the phosphorescent element.

In some embodiments, a phosphorescent sight system is provided, comprising a rear sight for disposition along a proximal portion of a slide substrate of a firearm, wherein: the rear sight comprises a first waveguide aperture and a second waveguide aperture disposed symmetrically about either side of a common optical axis; a front sight for disposition along a distal portion of the slide substrate, wherein: the front sight comprises a central waveguide aperture disposed along the common optical axis; a plurality of optical waveguides each disposed within the first waveguide aperture, the second waveguide aperture and the central waveguide aperture; and a plurality of phosphorescent elements each disposed adjacent a proximal portion of the optical waveguide within the first waveguide aperture and a proximal portion of the optical waveguide within the second waveguide aperture, wherein: the phosphorescent element operates between an active mode and an inactive mode based upon the application of excitation energy to the phosphorescent element; and the active mode and the inactive mode are separated by a threshold intensity of visible illumination produced by the optical waveguide and the phosphorescent element.

Exemplary embodiments of the present invention are illustrated in the accompanying figures. As shown in FIG. 1, a perspective view of a phosphorescent sight system 100 is provided. The phosphorescent sight system 100 may comprise a firearm 110 which may take the form a handgun, pistol, rifle, shotgun, assault rifle, semiautomatic, automatic, projectile launcher or other similar firearm types. The firearm 110 may support a slide substrate 120 that may be utilized to attach one or more accessories to the top portion of the body of the firearm 110. The slide substrate 120 may be elongate in nature and comprise a first proximal terminal end and a second distal terminal end.

In some embodiments, a rear sight 130 may be coupled along the slide substrate 120 at the proximal end thereof while a front sight 140 may be coupled along the slide substrate 120 at the distal end thereof. The rear sight 130 may comprise one or more sight reticles and/or apertures. The front sight 140 may comprise one or more sight reticles and/or apertures. In some embodiments, the rear sight 130 may comprise two sight reticles separated by a sight apertures. In some embodiments, the front sight 140 may comprise one sight reticle between two sight apertures.

Both of the rear sight 130 and the front sight 140 may be removably coupled to the slide substrate 120. Further, both of the rear sight 130 and the front sight 140 may couple to the slide substrate 120 in a modular manner such that the rear sight 130 and the front sight 140 may be coupled in a similar manner along any point of the slide substrate 120 or may be replaced altogether by different gun sights that may be coupled to the slide substrate 120 in a similar manner. Whether a fiber optic waveguide or an optical resonator waveguide is utilized with the rear or front sights 130, 140, the waveguide may similarly be removably coupled to the slide substrate 120 in a modular manner.

In some embodiments, one or more luminescent fiber optics (not shown) may be coupled to one or both of the rear sight 130 and the front sight 140. Further, the one or more luminescent fiber optics may be disposed between the rear sight 130 and the front sight 140 along the slide substrate 120. Additionally, the luminescent fiber optic may be contained within a housing that conforms to the shape of the rear sight 130 and the front sight 140.

Specifically, the luminescent fiber optic may comprise a luminescent element and a fiber optic element such that the luminescent element and the fiber optic element are disposed adjacent one another or otherwise operably coupled together. In some embodiments, the luminescent element may be a phosphorescent ring disposed around a fiber optic rod such that the proximity of the phosphorescent ring around the fiber optic rod causes the fiber optic rod to emit visible illumination.

The terms 'visible' and 'illumination' when used in the same phrase with similar context (as used in this and other paragraphs) may refer to: ambient light emitted from the given luminescent fiber optic, one or more coherent beams of illumination radiated in a singular general direction or combinations thereof. The luminescent fiber optic may be structurally segmented, impregnated with one or more luminescent materials, coated with one or more luminescent materials and the like.

Further, visible illumination emitted from the luminescent fiber optic or other similar waveguide may be within a predetermined wavelength band or may comprise a plurality of wavelength bands within the visible or non-visible spectrum of light. Additionally, the term "fiber optic" and related terms may be generally construed throughout the entirety of this document as any suitable waveguide structure and material.

The visible illumination may be utilized in the context of painting a target when using the firearm 110. Target painting allows a firearm user to visually confirm whether the gun is being accurately aimed at the target. Target painting is advantageous in nearly all settings, but particularly in low-visibility settings such as night-time environments, poorly-lit indoor settings, environments with weather elements and other similar settings. Further, the phosphorescent sight system 100 of FIG. 1 may advantageous over standard gun sights and existing luminescent aiming systems in that the phosphorescent sight system 100 allows of both the mechanical gun sights of the rear and front sights 130, 140 but also the optical gun sights of the luminescent fiber optic illumination beam.

The visible illumination may comprise a diverging beam radius. Advantageously, the structure of the fiber optic element may be such that the beam radius of the illumination beam diverges at a rate that provides a firearm user with a relatively constant visual beam radius from the perspective of the firearm user for any distance between the firearm user and the target that is typically encountered when using the firearm 110.

Figure 2:
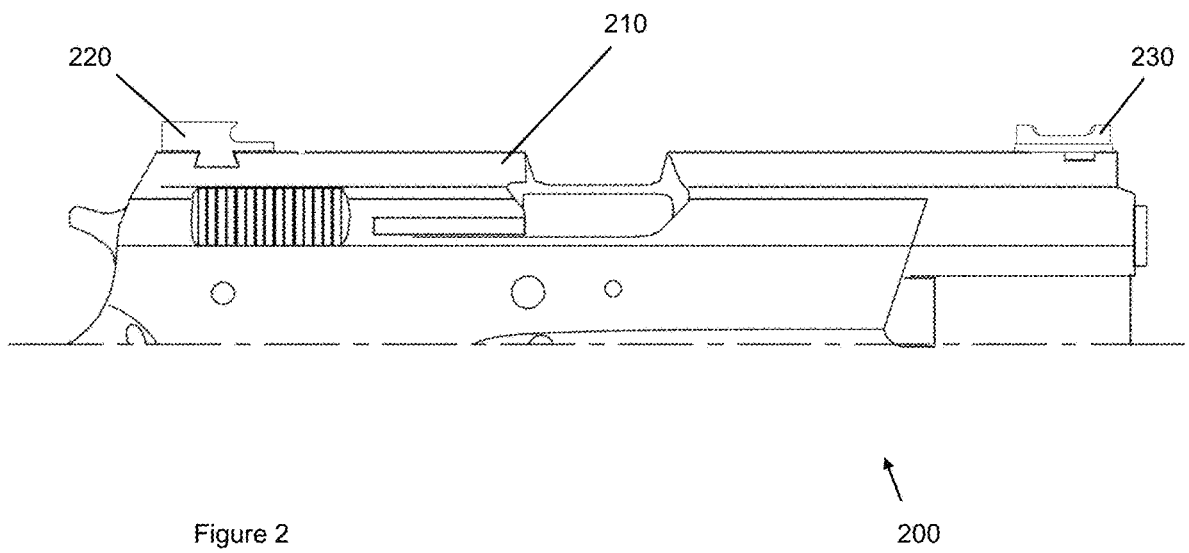
FIG. 2 illustrates a detailed view of a phosphorescent sight system in accordance with some embodiments of the present invention.

As shown in FIG. 2, a detailed view of a phosphorescent sight system 200 is provided. The phosphorescent sight system 200 may comprise a slide substrate 210 disposed upon a gun body, a rear gun sight 220 and a front gun sight 230. In some embodiments, the rear sight 220 may be coupled along the slide substrate 210 at the proximal end thereof while the front sight 230 may be coupled along the slide substrate 210 at the distal end thereof. The rear sight 220 may comprise one or more sight reticles and/or apertures. The front sight 230 may comprise one or more sight reticles and/or apertures. In some embodiments, the rear sight 220 may comprise two sight reticles separated by a sight apertures. In some embodiments, the front sight 230 may comprise one sight reticle between two sight apertures.

With regard to FIGS. 2A-2D, detailed views of the rear gun sight 220 and the front gun sight 230 are illustrated. While the rear gun sight 220 and the front gun sight 230 are shown as having a specific shape, it is to be understood that the rear or front gun sights 220, 230 may comprise a structurally similar shape without deviating from the spirit of the present invention. For instance, the number and/or shape of the sight reticles, sight apertures, areas of curvature, coupling mechanisms, cavities and the like may vary without deviating from the spirit of the present invention.

Figure 2A:
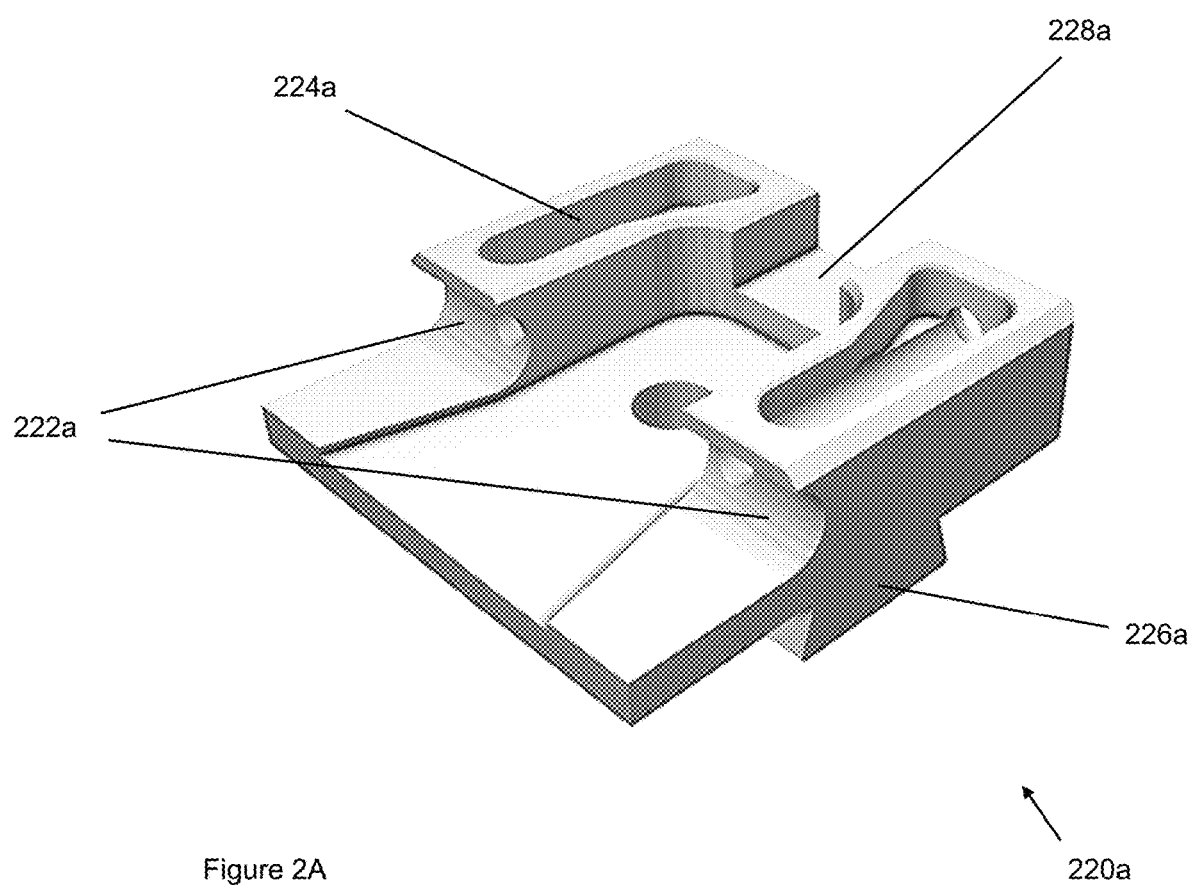
FIG. 2A illustrates a detailed perspective view of a rear sight of a phosphorescent sight system in accordance with some embodiments of the present invention.

As shown in FIG. 2A, a perspective view of a rear sight 220a of a phosphorescent sight system 200 is provided. The rear sight 220a may comprise one or more gun sight reticles 222a, one or more reticle cavities 224a, a slide substrate coupling mechanism 226a and a gun sight aperture 228a. The one or more gun sight reticles 222a may house the one or more reticle cavities 224a. Specifically, each of the one or more reticle cavities 224a may be structured to retain therein a luminescent fiber optic (not shown). Further, as shown in FIG. 2A, each of the one or more gun sight reticles 222a may comprise an opening on their top surface that form part of the reticle cavities 224a and serve to allow illumination from the luminescent fiber optic to emanate from the terminal ends of the elongate reticle cavities 224a but also from the top surface openings.

Further, the rear sight 220a may comprise a slide substrate coupling mechanism 226a disposed in part at a bottom surface of the rear sight 220a as shown in FIG. 2A. The coupling mechanism 226a may take any suitable shape but is preferably shaped to robustly operably couple to the slide substrate 210 in a removable and modular fashion. The gun sight aperture 228a may be disposed between the gun sight reticles 222a and may serve to provide the firearm user with a channel through which the firearm user may align the rear sight 220a with the front sight 230 discussed in more detail below.

Figure 2B:
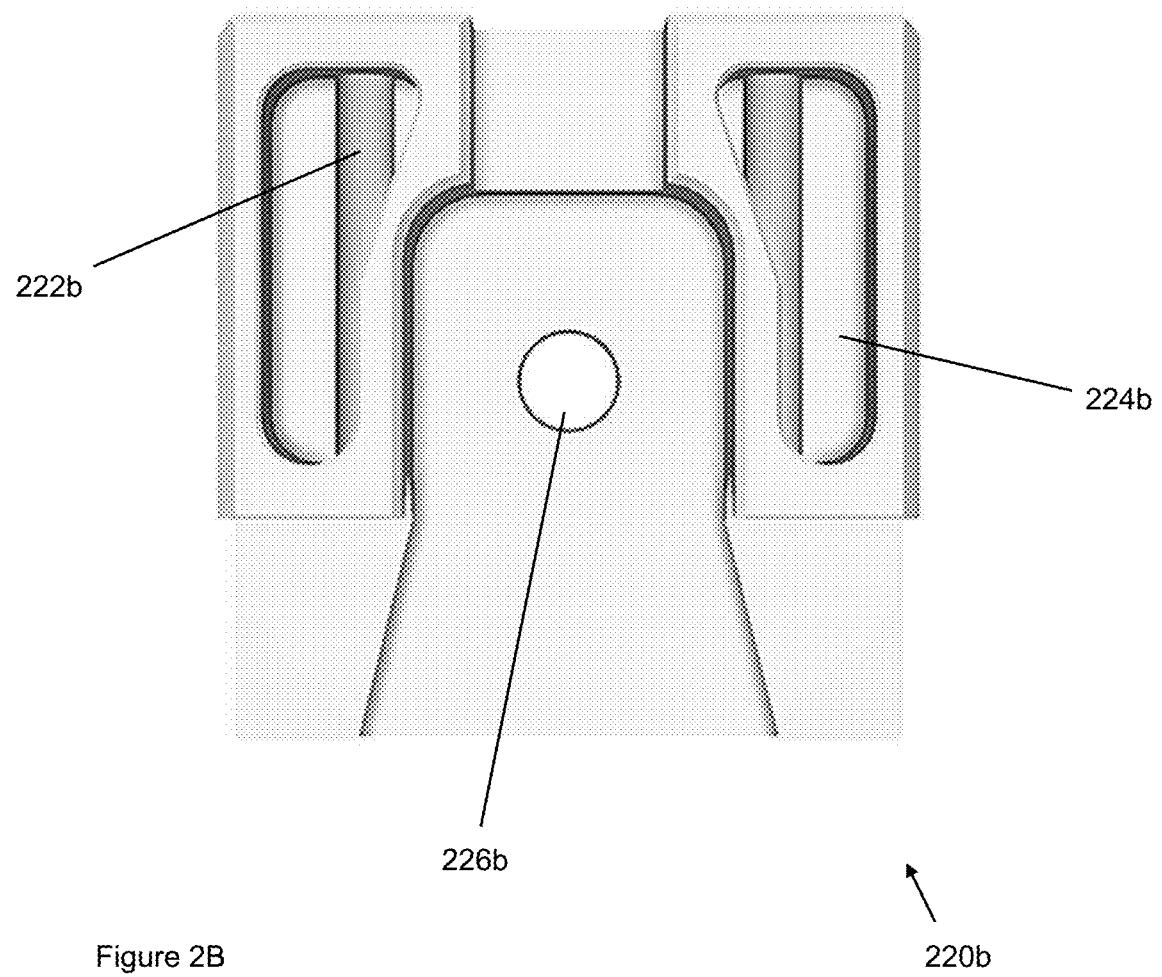
FIG. 2B illustrates a detailed plan view of a rear sight of a phosphorescent sight system in accordance with some embodiments of the present invention.

As shown in FIG. 2B, a detailed plan view of a rear sight 220b of a phosphorescent sight system 200 is provided. The rear sight 220b may comprise one or more fiber optic cavities 222b, one or more reticle cavities 224b and a coupling aperture 226b. In some embodiments, the one or more fiber optic cavities 222b may be structured to retain therein a luminescent fiber optic, optical resonator cavity or other similar waveguide element such that a visible coherent illumination beam may emit from one or more terminal ends of the fiber optic corresponding to the terminal ends of the fiber optic cavities 222b.

The one or more reticle cavities 224b may serve to provide additional ambient illumination while also providing the firearm user with an opening through which to physically manipulate a fiber optic into or out of the reticle cavities 224b. The coupling aperture 226b may comprise any suitable shape but is structured to accept a coupling element (not shown) therethrough such that the rear sight 220b may be robustly removably coupled to the slide substrate 210.

Figure 2C:
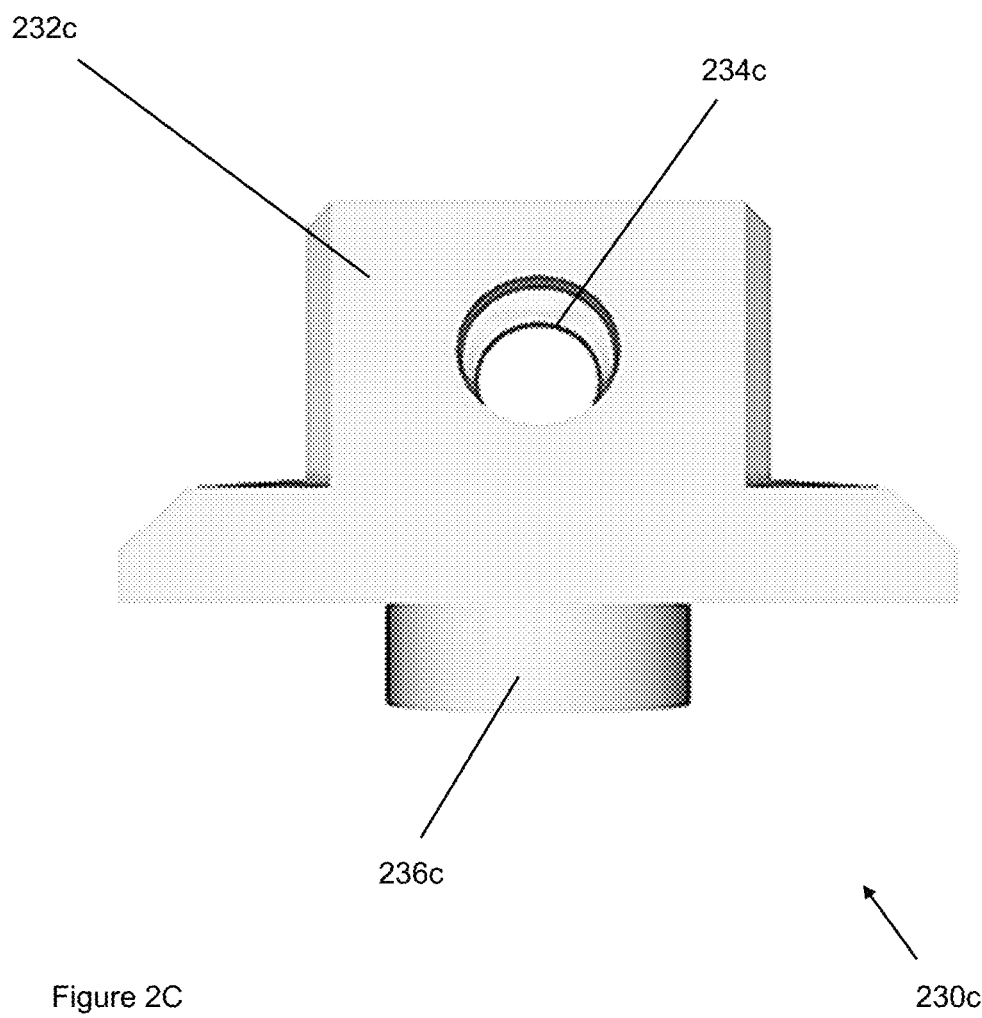
FIG. 2C illustrates a detailed front view of a front sight of a phosphorescent sight system in accordance with some embodiments of the present invention.

As shown in FIG. 2C, a detailed front view of a front sight 230c of a phosphorescent sight system 200 is provided. The front sight 230c may comprise a gun sight reticle 232c, a reticle cavity 234c and a coupling mechanism 236c. The gun sight reticle 232c may take any suitable shape but is illustrated in FIGS. 2 and 2C as being roughly a shallow U-shaped structure with a reticle cavity 234c disposed therethrough.

The reticle cavity 234c may be structured to retain therein a luminescent fiber optic such that a visible illumination may emit from the fiber optic. Alternatively, an optical resonating cavity or other similar waveguide may be utilized to produce a coherent illumination beam from one or more terminal ends of the reticle cavity 234c as shown in FIG. 2C. The coupling mechanism 236c may comprise any suitable shape but is structured to accept a coupling element (not shown) therethrough such that the front sight 220c may be robustly removably coupled to the slide substrate 210.

Figure 2D:
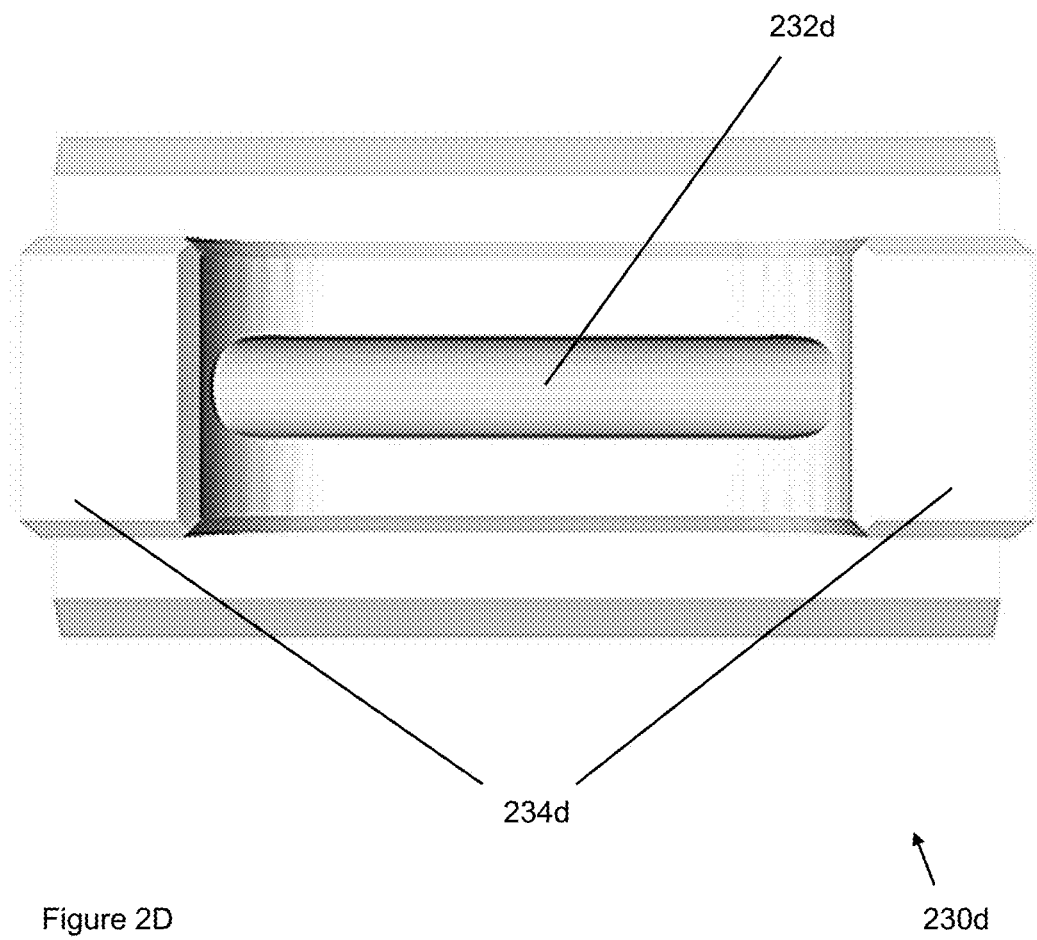
FIG. 2D illustrates a detailed plan view of a front sight of a phosphorescent sight system in accordance with some embodiments of the present invention.

As shown in FIG. 2D, a detailed plan view of a front sight 230d of a phosphorescent sight system 200 is provided. The front sight 230d may comprise a fiber optic cavity 232d and one or more gun sight reticles 234d. The fiber optic cavity 232d may pass through each of the one or more gun sight reticles 234d such that fiber optic cavity 232d may be aligned with the gun sight aperture 228a of the rear sight 220a of FIG. 2A. Further, each of the one or more gun sight reticles 234d may be optically aligned between the one or more gun sight reticles 222a of the rear sight 220a.

Similarly, the elongate slide substrate 210 may define a common horizontal axis along which each of the rear sight 220 components and the front sight 230 components are aligned relative one another. For instance, the gun sight aperture 228a may be aligned directly along the common horizontal axis. The one or more gun sight reticles 222a and the one or more fiber optic cavities 222b may be aligned symmetrically on either side of the common horizontal axis and may further align with the gun sight apertures disposed on left and right sides of the gun sight reticle 232c. The reticle cavity 234c may aligned directly along the common horizontal axis. Similarly, each of the one or more gun sight reticles 234d may be aligned directly along the common horizontal axis.

The emitted visible illumination and/or coherent illumination beam from the one or more luminescent fiber optics (not shown) may also be aligned relative the common horizontal axis. Specifically, the luminescent fiber optics disposed within the fiber optic cavities 222b of FIG. 2B may be aligned symmetrically along either side of the common horizontal axis. Further, the luminescent fiber optic disposed within the fiber optic cavity 232d of FIG. 2D may be aligned directly along the common horizontal axis.

As an alternative or in addition to the fiber optic waveguide, an optical resonator (such as those for producing a laser beam) may be utilized to produce a coherent illumination beam for painting a target. Specifically, both the rear and front sights 220, 230 may comprise one or more fiber optic waveguides and/or optical resonators disposed therein. In some embodiments, the rear sight 220 may comprise a plurality of fiber optic waveguides disposed within respective cavities and the front sight 230 may comprise an optical resonator disposed within its cavity with the resultant coherent illumination beam being emitted in a direction away from the firearm user and centered about a common horizontal axis along the slide substrate 210.

As shown in FIG. 3, a cross-sectional view of a phosphorescent ring 310 disposed around a fiber optic waveguide 320 of a phosphorescent sight system 300 is provided. While any suitable shape of a luminescent element and any suitable luminescing material may be utilized, a phosphorescent ring 310 is illustrated in FIG. 3. Specifically, the phosphorescent ring 310 may be shaped as an annular ring disposed around the outer circumference of the fiber optic waveguide 320.

With regard to the horizontal position of the phosphorescent ring 310 along the fiber optic waveguide 320, the phosphorescent ring 310 may be disposed adjacent a proximal terminal end (i.e. closest to the firearm user) of the fiber optic waveguide 320 if used on the rear gun sight 220. If used on the front gun sight 230, then the phosphorescent ring 310 may be disposed adjacent a proximal terminal end (i.e. closest to the firearm user) of the fiber optic waveguide 320. The positioning of the phosphorescent ring 310 may determine the quality of the emitted visible illumination from the fiber optic waveguide 320 in the direction desired by the firearm user.

Using the example of FIG. 2, two fiber optic waveguides 320 may be utilized with the rear sight 220, one for each fiber optic cavity 222b. One fiber optic waveguide 320 may be utilized with the front sight 230 corresponding to its single fiber optic cavity 232d. Therefore, two phosphorescent rings 310 may be utilized within the rear sight 220, one for each fiber optic waveguide 320. One phosphorescent ring 310 may be utilized with the front sight 230, corresponding to its single fiber optic waveguide 320.

Given the positioning of the phosphorescent ring 310 along the fiber optic waveguide 320 for each of the rear sight 220 and the front sight 230, a structural feature may be formed into each of the rear and front sights 220, 230 corresponding to the shape of the phosphorescent ring 310. Specifically, a ring well (not shown) shaped to accept the structure of the phosphorescent ring 310 may be formed into the rear and front sights 220, 230 at the location where the phosphorescent ring 310 is to be disposed within the body of the rear and front sights 220, 230. Alternatively, the ring wells may be formed into a corresponding housing (not shown) that houses the entirety of the slide substrate 210, rear sight 220, front sight 230, phosphorescent rings 310 and fiber optic waveguides 320.

The ring wells formed into the housing may be positioned according to the previously disclosed positioning of the phosphorescent rings 310. Each of the ring wells may comprise a highly reflective material layer coated upon the exterior surface of the ring well facing the phosphorescent ring 310. The reflective layer may serve to enhance the quality of the emitted visible illumination from the fiber optic waveguide 320. Further, the reflective layer may serve to direct an emitted visible coherent illumination beam from the fiber optic waveguide 320 in the direction desired by the firearm user. In some embodiments, the reflective layer may comprise one or more of: metal, metal nanoparticle, polymer material, a white-colored material, a metallic-colored material, paint and any combinations thereof.

The phosphorescent ring 310 may operate between an active mode and an inactive mode. In the active mode, the phosphorescent ring 310 may actively produce the emitted visible illumination with a threshold level of intensity (e.g. visible to the average human eye at common firearm distances). In the inactive mode, the phosphorescent ring 310 does not produce the emitted visible illumination at all or only produces it below the threshold level of intensity.

Advantageously, any fiber optic waveguide utilized may direct the phosphorescent ambient light produced back toward the eye of the firearm user so that the firearm user can better align their sight. However, any optical resonator producing a coherent illumination beam may direct the beam away from the eye of the firearm user so that the firearm user can paint the target with the beam and thereby can better align their aim. Further, the intensity of the light produced by the ambient phosphorescence that is directed back to the eye of the firearm user will be small enough so as not to saturate the firearm user's eye with light and thereby blind the user's aim in low-light environments. Similarly, the intensity of the light produced by the coherent illumination beam directed away from the eye of the user will be large enough so as to allow illumination of a target at longer distances in which a firearm is typically used.

Excitation of the phosphorescent ring 310 with a threshold amount of excitation energy places the phosphorescent ring 310 into the active mode. Upon being placed into the active mode, the excited phosphorescent ring 310 will decay down back into the inactive mode, where the rate of decay follows a roughly inverse exponential function. Therefore, when the phosphorescent ring 310 is fully excited, the emitted visible illumination may comprise a maximum output intensity. Some time after this maximum phase, the phosphorescent ring 310 may produce a significantly decreased output intensity, but still above the threshold intensity, thereby defining a moderate phase. After this moderate phase, the phosphorescent ring 310 may decay back into the inactive mode where the emitted visible illumination is no longer visible to the human eye or is no longer being produced at all.

In order to keep the phosphorescent ring 310 in the active mode (and more preferably near the maximum phase), the phosphorescent ring 310 may be periodically pulsed with excitation energy. Incident excitation energy may come from any suitable optical source including, but not limited to, the sun, a UV light source, an LED and other similar optical sources of excitation energy. Advantageously, the phosphorescent ring 310 may be periodically pulsed with excitation energy at rates between 1 second per minute and 2 seconds per minute but any pulse duration may be utilized.

This range of pulsed energy provides the phosphorescent ring 310 the ability to stay near the maximum phase without expending unnecessary exception energy. Further, this range of pulsed energy does not waste excess excitation energy and thereby optimally excites the phosphorescent ring 310. Alternatively, the phosphorescent ring 310 may be manually excited with a larger constant intensity of excitation energy that provides the phosphorescent ring 310 with its full decay time of roughly 30 hours which is superior to existing luminescent optics. While a ring is depicted in FIG. 3 as the phosphorescent element shape, any suitable phosphorescent element may be utilized with the optical waveguide. Further, any additional accessory may be utilized with the optical waveguide and/or phosphorescent element including, but not limited to, beam splitters, red dot sights, mirrors, prisms and the like or any combinations thereof.

The operation of the excitation energy at specific pulse rates may be controlled by a preprogrammed timer circuit and associated printed circuit board. The timer circuit may operate in a manual actuation mode where the excitation energy is constantly incident upon the phosphorescent ring 310 and in a pulsed mode where the excitation energy is pulsed at the phosphorescent ring 310 in the manner maintaining the active move of the ring as previously disclosed.

In some embodiments, the wavelength of the excitation energy may be any suitable wavelength, but the spectrum of excitation energy may preferably contain the 400-410 nanometer band. For instance, the sun's energy contains the 400-410 nanometer band of energy and so could be utilized while also a standalone UV light emitting within the narrow band of 400-410 nanometers may also be used without significant difference in the produced emitted visible illumination.

The phosphorescent ring 310 may comprise a diameter to thickness ratio value that ensures proper production of the emitted visible illumination. In some embodiments, the phosphorescent ring 310 may comprise a 0.1 inch diameter and a 0.04 inch thickness. Such dimensions would produce a 0.4 thickness to diameter ratio, where a range of values between 0.25 and 0.6 would provide advantageous production of the emitted visible illumination.

The fiber optic waveguide 320 may be made from any suitable material including silica, phosphate glass, chalcogenide glass, fluoride glass, acrylic PMMA glass, fluoropolymer-based glass and other similar materials or any combinations thereof. The phosphorescent ring 310 may be made of a strong epoxy material or other like material that is molded into suitable dimensions and may contain europium, zinc sulfide, strontium aluminate, calcium sulfide, alkaline silicates and similar materials or any combinations thereof.

As shown in FIG. 4, a flow diagram of a method of manufacture 400 of a phosphorescent sight system is provided. At step 410, a phosphorescent ring may be fabricated using a prefabricated mold for mass production. At step 420, a prefabricated fiber optic rod may be inserted through the inner aperture of the annular phosphorescent ring. At step 430, the first end of the fiber optic rod may be set with the phosphorescent ring within the gun sight housing. At step 440, the first end of the fiber optic rod may be heated. At step 450, any excess length of the fiber optic rod may be cut off at a second end. At step 460, the second end of the fiber optic rod may be heated for securement into its final position.

Each of the steps of FIG. 4 may be performed in any suitable order while not deviating from the spirit of the present invention. Additionally, heating of the fiber optics may be performed in order to provide a more snug fit within the fiber optic cavities and for more optimal production of the visible illumination.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A phosphorescent sight system, comprising:
a rear sight for disposition along a proximal portion of a slide substrate of a firearm;
a front sight for disposition along a distal portion of the slide substrate;
an optical waveguide disposed within a first waveguide aperture of the rear sight or the front sight; and
a phosphorescent element disposed adjacent the optical waveguide, wherein a predetermined amount of excitation energy maintains the phosphorescent element in an active mode.

2. The phosphorescent sight system of claim 1, wherein the phosphorescent element is a phosphorescent ring disposed within a ring well that structurally corresponds to dimensions of the phosphorescent ring.

3. The phosphorescent sight system of claim 1, wherein the phosphorescent element is excited into an active mode by excitation energy incident thereupon.

4. The phosphorescent sight system of claim 3, wherein, upon being excited into the active mode, the phosphorescent element begins to decay towards an inactive mode.

5. The phosphorescent sight system of claim 3, wherein the active mode and the inactive mode are separated by a threshold intensity of visible illumination produced by the optical waveguide and the phosphorescent element.

6. The phosphorescent sight system of claim 5, wherein the threshold intensity of the visible illumination corresponds to the capability of a human eye to physically detect the intensity of the visible illumination.

7. The phosphorescent sight system of claim 1, wherein:
the rear sight comprises the first waveguide aperture and a second waveguide aperture disposed symmetrically about either side of a common optical axis; and
the front sight comprises a third waveguide aperture disposed along the common optical axis.

8. The phosphorescent sight system of claim 1, wherein the rear sight and the front sight collectively comprise a plurality of optical waveguides and a plurality of phosphorescent elements.

9. The phosphorescent sight system of claim 8, wherein each of the plurality of phosphorescent elements of each of the rear sight and the front sight are disposed adjacent the associated optical waveguide at a proximal end of the optical waveguide closest to a firearm user.

10. The phosphorescent sight system of claim 1, wherein a source of the excitation energy is contained within the rear sight or the front sight.

11. The phosphorescent sight system of claim 1, wherein the optical waveguide and the phosphorescent element together produce visible illumination.

12. The phosphorescent sight system of claim 11, wherein the visible illumination is a coherent illumination beam.

13. The phosphorescent sight system of claim 1, wherein the optical waveguide is a fiber optic.

14. The phosphorescent sight system of claim 1, wherein the optical waveguide is an optical resonator.

15. The phosphorescent sight system of claim 1, wherein the optical waveguide is contained within a laser beam-producing system that is itself contained within the front sight.

16. The phosphorescent sight system of claim 1, wherein the predetermined amount of excitation energy comprises pulsing the phosphorescent element with excitation energy for a time duration within a range between 1 second per 1 minute and 2 seconds per 1 minute.

17. A phosphorescent sight system, comprising:
a rear sight for disposition along a proximal portion of a slide substrate of a firearm;
a front sight for disposition along a distal portion of the slide substrate;
an optical waveguide disposed within a first waveguide aperture of the rear sight or the front sight; and
a phosphorescent element disposed adjacent a proximal portion of the optical waveguide, wherein:
the phosphorescent element operates between an active mode and an inactive mode based upon the application of excitation energy to the phosphorescent element, wherein a predetermined amount of excitation energy maintains the phosphorescent element in the active mode; and
the active mode and the inactive mode are separated by a threshold intensity of visible illumination produced by the optical waveguide and the phosphorescent element.

18. A phosphorescent sight system, comprising:
a rear sight for disposition along a proximal portion of a slide substrate of a firearm, wherein:
the rear sight comprises a first waveguide aperture and a second waveguide aperture disposed symmetrically about either side of a common optical axis;
a front sight for disposition along a distal portion of the slide substrate, wherein:

the front sight comprises a third waveguide aperture disposed along the common optical axis;

a plurality of optical waveguides each disposed within the first waveguide aperture, the second waveguide aperture and the third waveguide aperture; and a plurality of phosphorescent elements each disposed adjacent a proximal portion of the optical waveguide within the first waveguide aperture and a proximal portion of the optical waveguide within the second waveguide aperture, wherein:

the phosphorescent element operates between an active mode and an inactive mode based upon the application of excitation energy to the phosphorescent element, wherein a predetermined amount of excitation energy maintains the phosphorescent element in the active mode; and the active mode and the inactive mode are separated by a threshold intensity of visible illumination produced by the optical waveguide and the phosphorescent element.

* * * * *